(12) United States Patent
Clary

(10) Patent No.: US 6,360,827 B1
(45) Date of Patent: Mar. 26, 2002

(54) METHOD AND APPARATUS FOR A TRANSPORTABLE BOX BLADE ASSEMBLY

(75) Inventor: Thomas W. Clary, Milford, IA (US)

(73) Assignee: Clary Investment, Inc., Milford, IA (US)

(*) Notice: Subject to any disclaimer, the term of this patent is extended or adjusted under 35 U.S.C. 154(b) by 0 days.

(21) Appl. No.: 09/512,549

(22) Filed: Feb. 24, 2000

(51) Int. Cl.[7] ............................................... A01B 49/02
(52) U.S. Cl. ..................... 172/799.5; 172/142; 172/196
(58) Field of Search ............................ 172/445.1, 197, 172/199, 196, 200, 142, 684.5, 780, 781, 784, 795, 799.5; 37/412–414, 404, 407, 903

(56) References Cited

U.S. PATENT DOCUMENTS

| | | | |
|---|---|---|---|
| 2,433,019 A | 12/1947 | Arps | 37/126 |
| 2,443,884 A | 6/1948 | Arps | 37/126 |
| 2,624,133 A | 1/1953 | Smeed | 37/150 |
| 2,897,615 A | 8/1959 | Hills et al. | 37/145 |
| 4,217,962 A * | 8/1980 | Schaefer | 172/197 |
| 4,320,988 A | 3/1982 | Seal | 37/150 |
| 4,333,250 A | 6/1982 | Henderson | 37/117.5 |
| 4,337,833 A | 7/1982 | Welch | 172/445.1 |
| 4,524,532 A | 6/1985 | Browning | 37/117.5 |
| 4,630,686 A | 12/1986 | Aismus, Jr. | 172/393 |
| 4,815,542 A | 3/1989 | Deplazes | 172/253 |
| 5,074,061 A * | 12/1991 | Thompson | 37/129 |
| 5,794,714 A * | 8/1998 | Brown | 172/799.5 |

* cited by examiner

Primary Examiner—Robert E. Pezzuto
(74) Attorney, Agent, or Firm—Zarley, McKee, Thomte, Voorhees & Sease, PLC

(57) ABSTRACT

An apparatus and method transporting an attachment, such as a box blade assembly, which is secured to a land based vehicle has a box blade and a transporting mechanism. The box blade is made up of two opposing side walls, an open top and bottom, and front and rear sides. The walls are connected using frame members and a cutting surface extends between the side walls and below the bottom edge of the side walls. The transporting mechanism is comprised of a movable frame member rotatably secured to the rear of the box blade at one end and operatively secured to one or more wheels at the other end. A lifting member, which may be a hydraulic cylinder or hand crank, is operatively secured to the movable frame member and to the top of the box blade. Using a single point of attachment hitch, such as a ball type hitch, the box blade may still be lifted from the work surface for easy transport, and then easily lowered for use on a work surface.

21 Claims, 3 Drawing Sheets

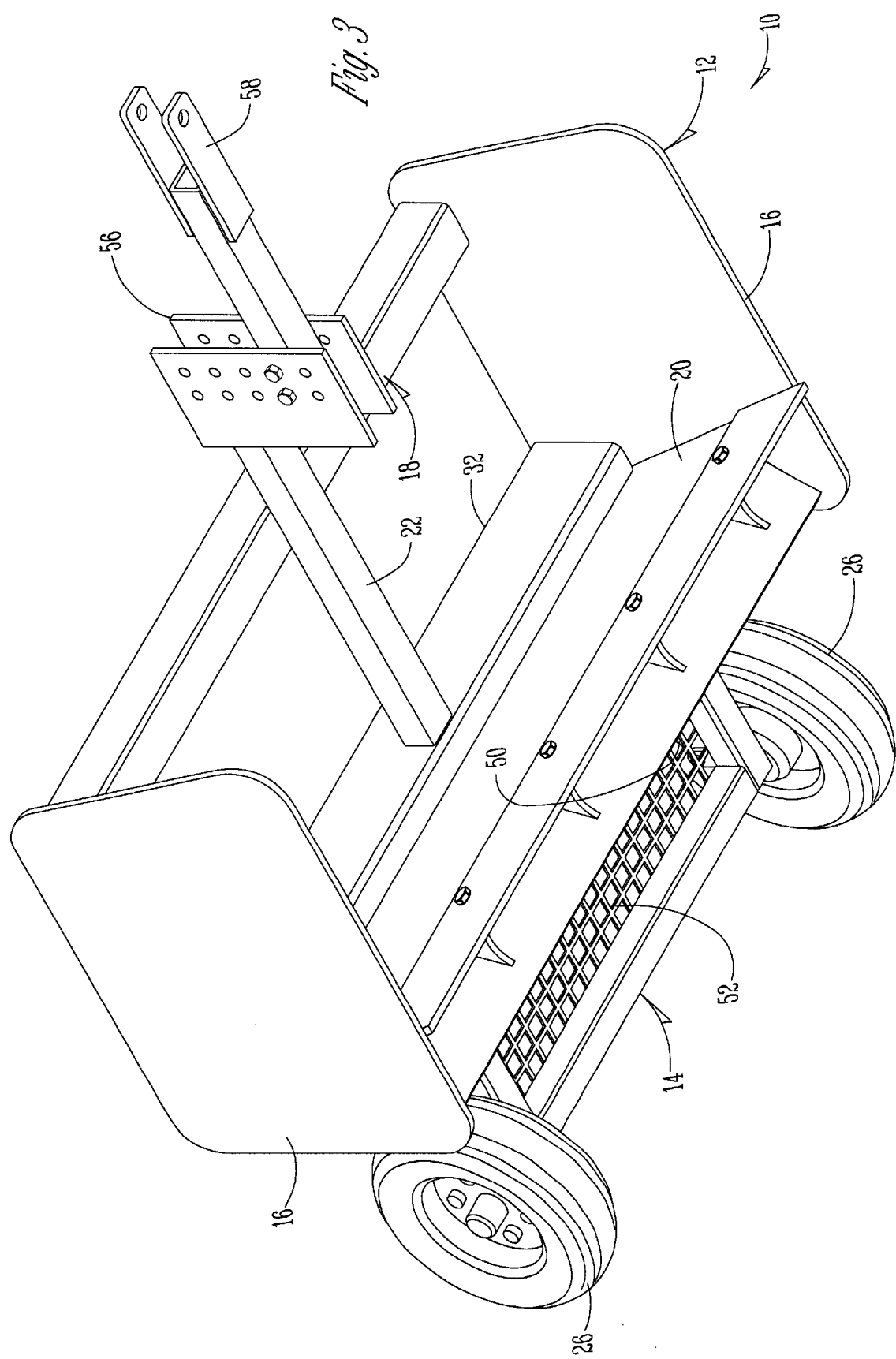

METHOD AND APPARATUS FOR A TRANSPORTABLE BOX BLADE ASSEMBLY

BACKGROUND OF THE INVENTION

1. Field of the Invention

The present invention relates generally to an attachment to a land based vehicle (such as a lawn and garden tractor) and more particularly to a box blade assembly in which the box blade may be raised or lowered in a manner which allows contact with the work surface when in use, and easy transport when not in use.

2. Problems in the Art

Small land based vehicles, such as lawn tractors, all terrain vehicles, garden trucks, and the like are commonly used to pull various attachments such as a box blade. Box blades, such as the one shown in U.S. Pat. No. 4,333,250 to Herderson, herein incorporated by reference, are well known.

Currently, box blades and other such attachments are secured to the small land based vehicle using a three point hitch. The lifting mechanism for the box blade assembly must therefore be located on the land based vehicle. This limits the use of the box blade to small tractors which are equipped to receive a three point hitch attachment. Further, when in transport mode, the entire weight of the box blade is supported by the land based vehicle at the point of attachment causing added stress and wear on the metal of the hitch.

Prior attempts to make box blades available for use on small vehicles not suited for three point hitch attachment have left many problems unsolved. For example, U.S. Pat. No. 4,630,686 to Ausmus used a ball type hitch to secure a scraper to a small tractor. While such assembly took stress off of the land based vehicle, it left only runners for use in transport. Further, the entire blade assembly could not be lifted from the work surface.

There is therefore a need to provide a box blade assembly which may be used on land based vehicles not equipped to handle a three point hitch. Additionally, there is a need to provide a method of transporting the box blade so as to lift the entire box blade from the work surface using a lifting mechanism not located on the land based vehicle that avoids significant hitch stress. Further, it is desirable to have a box blade assembly which may be transported easily.

There is therefore an unfilled need for a box blade assembly which solves these and other problems. This invention has as its primary objective fulfillment of this need.

Some Features of the Invention

A general feature and objective of the present invention is the provision of a box blade assembly which overcomes the problems found in the prior art.

A further feature and objective of the present invention is the provision of a box blade assembly which is secured to a land based vehicle using a ball type hitch.

A yet further feature and objective of the present invention is the provision of a box blade assembly which may be raised in its entirety from the work surface.

Another feature and objective of the present invention is the provision of a box blade assembly which may be easily transported.

A still further feature and objective of the present invention is the provision of a box blade assembly which may be raised or lowered without help from the land based vehicle.

These, as well as other features, objectives and advantages of the present invention, will become apparent from the following specification and claims.

SUMMARY OF THE INVENTION

The present invention generally comprises a box blade having at least two opposing side walls, an open top and bottom, and front and rear sides. The walls are connected using frame members and a cutting surface extends between the side walls and below the bottom edge of the side walls. A movable frame member is rotatably secured to the rear of the box blade at one end and operatively secured to one or more wheels at the other end. A lifting member is operatively secured to the movable frame member and to the top of the box blade.

In a preferred embodiment, the present invention includes a ball type hitch to secure the box blade assembly to a land based vehicle.

BRIEF DESCRIPTION OF THE DRAWINGS

FIG. 3 is a bottom perspective view of the box blade assembly.

DETAILED DESCRIPTION OF THE PREFERRED EMBODIMENT(S)

The present invention will be described as it applies to its preferred embodiment. It is not intended that the present invention be limited to the described embodiment. It is intended that the invention cover all modifications and alternatives which may be included within the spirit and scope of the invention.

Figure 1:
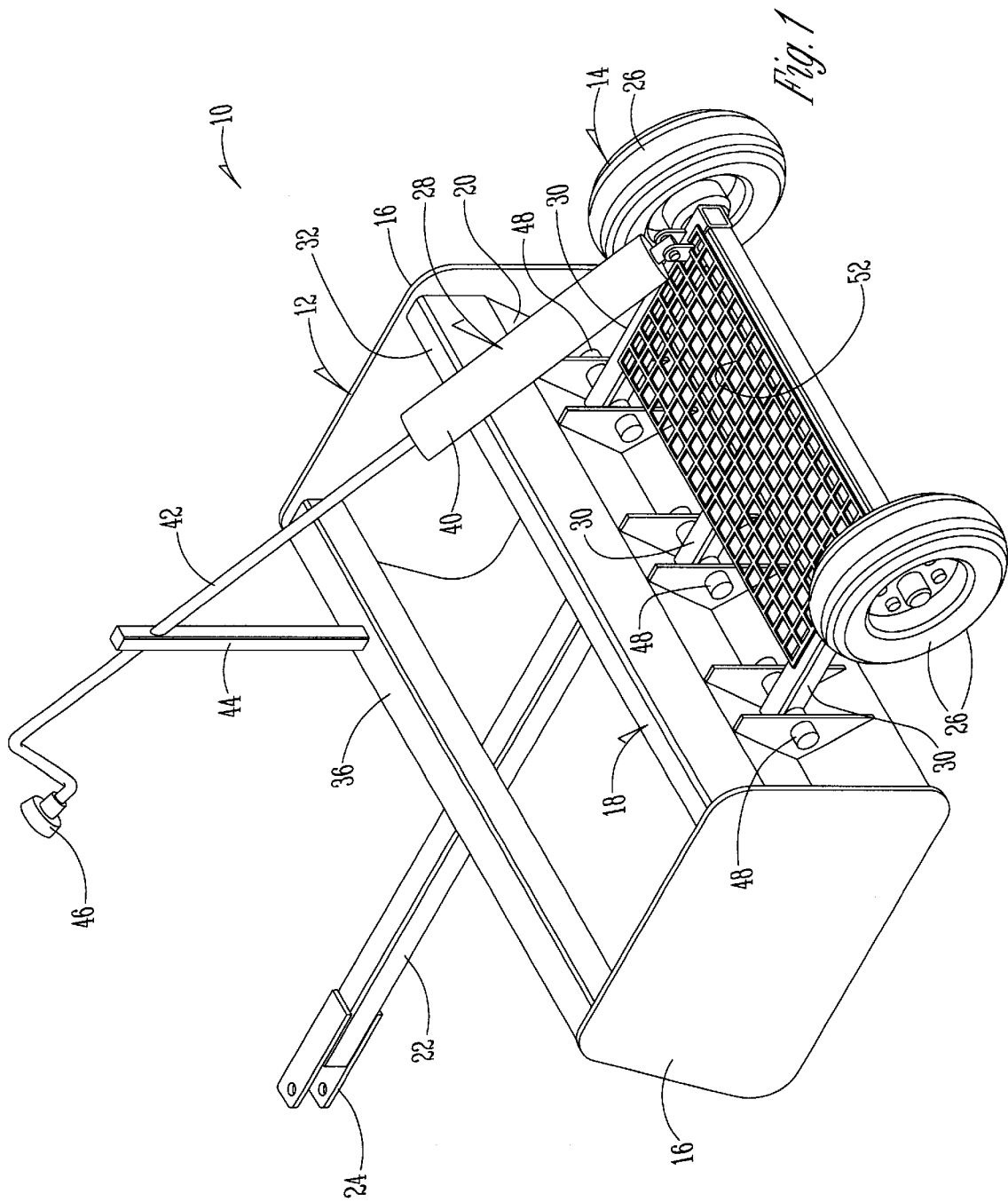
FIG. 1 is a rear perspective view of the box blade assembly with a crank lifting mechanism.

Now, referring to the drawings, FIG. 1 illustrates the box blade assembly 10 including a box blade 12 and a transporting mechanism 14. The box blade 12 is made up of two opposing parallel sidewalls 16 connected by several frame members 18 running transversely between the sidewalls 16. The box blade may be of any desired width, however, typically a width of three to eight feet is used. Also, as shown in FIG. 3, running transversely between the two sidewalls 16 and at the rear side 32 of the box blade 12, is the attachment plate 54 to which the cutting surface 20 is removably secured.

The cutting surface 20 extends below the bottom edge of the sidewalls 16 and is angled to optimize cutting ability using the power typically available on smaller land based vehicles such as all terrain vehicles and garden tractors. The cutting surface 20 is secured within the box blade 12 to contact the ground at a specific angle. While any angle will work with the invention, the preferred angle is between 15 and 30 degrees, measured between the cutting surface 20 and the working surface. The use of a preferred angle reduces the force necessary to pull the box blade 12 and thereby allows a greater variety of land based vehicles to be used.

The cutting surface 20 is preferably bolted to the attachment plate 54. By removably securing the cutting surface 20 to the attachment plate 54, a user can replace the blade when needed.

In operation, the cutting surface 20 will smooth out or cut the working surface to leave a flat or planar region. Many working surfaces, such as lawns and fields, are composed of a mixture of materials including small gravel, dirt and large rocks. Large rocks and other menacing objects may be removed by the operator of the box blade 12 and placed on the grate 52 located on the rear side of the box blade 12 and secured to the moveable frame 30. The grate 52 may be surrounded by walls to prevent any rocks or other objects from falling out during operation or transport. After use, the operator may then remove the objects to a desired location.

A hitch support 22 is secured to the front end of the box blade 12 near the middle of the frame member 18. The hitch support 22 may be bolted to the frame member and thereby removed for transport and shipping purposes. The hitch support 22 as shown, is fitted for a single point pin attachment 24 which may be easily secured to an all terrain vehicle or garden tractor. Other types of single point hitch attachments may be used such as a ball-type hitch, or a ball coupler hitch, commonly found on various types of land-based vehicles including cars, trucks and light tractors. Additionally, the hitch support 22 may include an adjuster 56, as shown in FIG. 3, which allows a hitch attachment 58 to be placed at various heights. Such an adjuster 56 is typically composed of two steel plates welded onto the hitch support 22 so as to be parallel one another and perpendicular to the working surface. On both of these plates, corresponding holes are drilled which allow a user to secure a hitch attachment 58 at various heights. By adjusting the height of the hitch attachment 58, the box blade 12 can be kept level with the working surface while in use.

Figure 2:
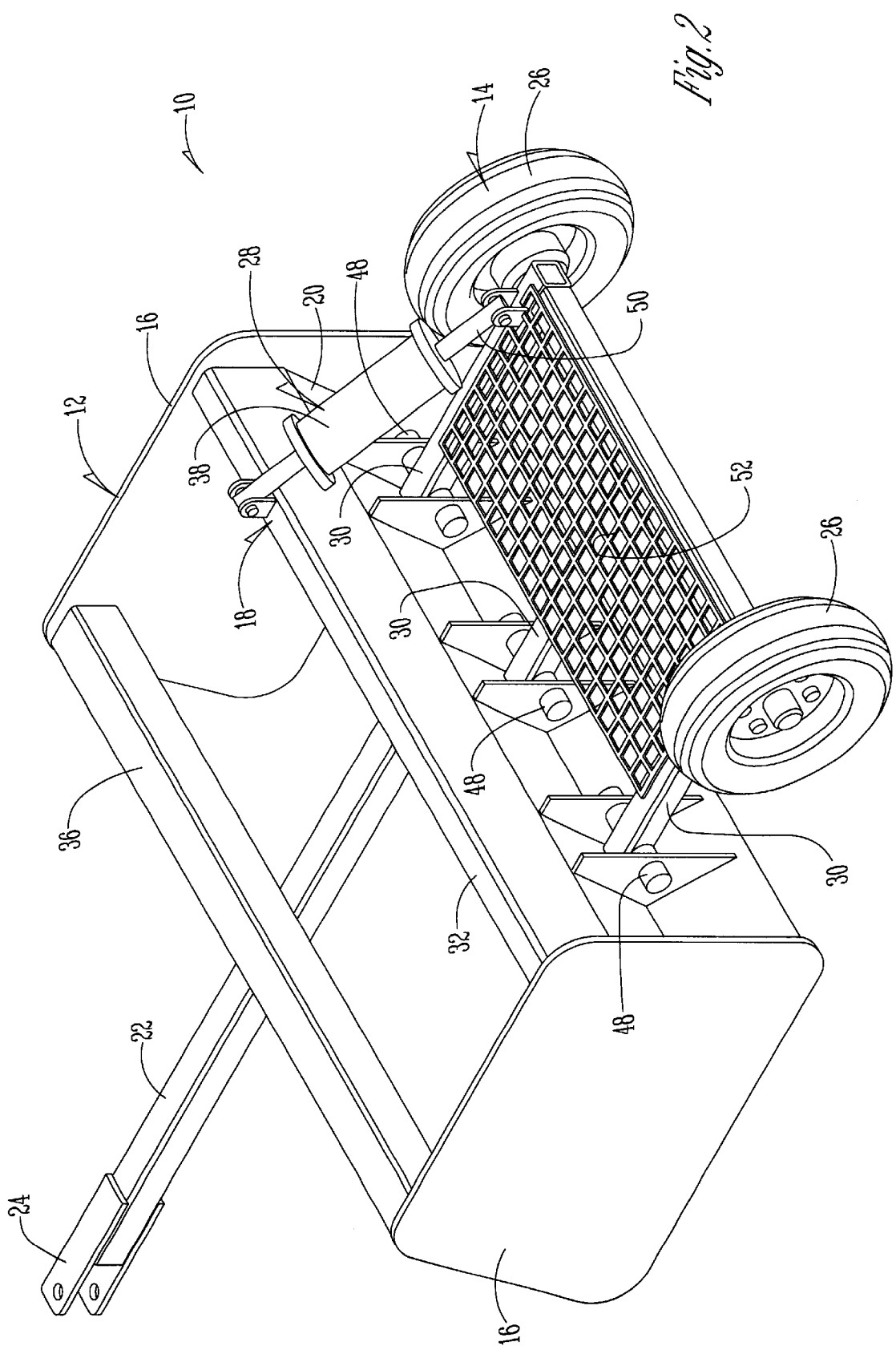
FIG. 2 is a rear perspective view of the box blade assembly with a hydraulic lifting mechanism.

As is best seen in FIG. 2, the transporting mechanism 14 includes two wheels 26 secured to a moveable frame 30 by an axle which runs through one end of the moveable frame 30. The moveable frame 30 is rotatably secured to the rear side 32 of the box blade 12 at three locations. The moveable frame 30 is attached using pins 48 as connectors on the rear side 32 of the box blade 12. The pins 48 may be removable to allow a user to remove the entire transporting mechanism 14. With the pins 48 in place, a hinge like connection is formed between the transporting mechanism 14 and the box blade 12.

A lifting mechanism 28 is attached to the top 36 of the box blade 12 on one end and to the moveable frame 30 on the other. As shown in FIG. 2, one embodiment of the lifting mechanism 28 is a hydraulic cylinder 38 with a shaft 50. A typical hydraulic cylinder 38 requires a control box located near the operator. This also requires an electrical connection to a power supply on the land based vehicle.

In operation, when the hydraulic cylinder 38 lengthens the exposed portion of the shaft 50, the moveable frame 30 lowers along with the wheels 26. When contact is made with the work surface, the hydraulic cylinder 38 can continue to lengthen the exposed portion of the shaft 50 so as to raise the box blade 12 from the work surface. When the exposed portion of the shaft 50 has reached its maximum length, the box blade 12 is no longer in contact with the work surface.

The exposed portion of the shaft 50 may be shortened to lower the box blade 12 to the work surface. Upon the box blade 12 contacting the work surface, the shaft 50 may be further shortened to remove the wheels 26 from contact with the work surface. This allows the box blade 12 to be used to smooth a work surface without any noticeable markings left by the wheels 26 and applies the greatest possible pressure to the cutting surface 20. The wheels 26 may also be left in contact with the work surface, limiting the amount of pressure on the cutting surface 20.

As shown in FIG. 1, the lifting mechanism 28 may alternatively comprise a crank 40. The crank 40 is attached similarly to the hydraulic cylinder 38. The crank 40 requires no electrical power and is simply lengthened or shortened using a turning rod 42. The turning rod 42 is supported by the steel support beam 44 which is connected to the hitch 22. At the top of the turning rod 42, a crank handle 46 is located so as to be within the reach of a user. As seen in FIG. 4, the location of the turning rod 42 and the crank handle 46 allows a user to be located at the front end of the box plate assembly 10 as if sitting on an all terrain vehicle or garden tractor, and still operate the transporting mechanism 14 located at the rear of the box blade assembly 10.

A general description of the present invention as well as a preferred embodiment of the present invention has been set forth above. Those skilled in the art to which the present invention pertains will recognize and be able to practice additional variations in the methods and systems described which fall within the teachings of this invention. Accordingly, all such modifications and additions are deemed to be within the scope of the invention which is to be limited only by the claims appended hereto.

What is claimed is:

1. A box blade assembly for attachment to a land based vehicle without the need for a three point hitch, and for use on a work surface comprising:

a box blade having at least two opposing side walls, an open top and bottom, front and rear sides, one or more frame members connecting the side walls and a cutting surface running between the side walls and extending below the bottom edge of said side walls;

a movable frame member, having a front and rear section, wherein said front section is rotatably secured to the rear side of the box blade;

one or more wheels operatively secured to the rear section of the movable frame member;

a grate secured on the movable frame member; and a lifting member operatively secured to the box blade and the movable frame member.

2. The box blade assembly of claim 1 wherein the lifting member is a crank.

3. The box blade assembly of claim 1 wherein the lifting member is a hydraulic cylinder.

4. The box blade assembly of claim 1 wherein the cutting surface contacts the working surface at an angle in the range of about 15 to 30 degrees.

5. The box blade assembly of claim 1 further comprising:

an attachment member secured to the front side of the box blade and to the land based vehicle.

6. The box blade assembly of claim 5 wherein the attachment member comprises a ball type hitch.

7. The box blade assembly of claim 5 wherein the land based vehicle is an all terrain vehicle.

8. The box blade assembly of claim 5 wherein the land based vehicle is a garden tractor.

9. A method for transporting a box blade secured to a land based vehicle comprising:

extending a lifting member which is operatively secured to a frame member, the frame member having a front and rear sections, the frame member being rotatably secured between one or more wheels at the rear section and the box blade at the front section, the extension of the lifting member thereby lowering said one or more wheels until contact is made with a work surface and the box blade has been lifted up so as to no longer be in contact with the work surface;

pulling the box blade with the land based vehicle which is secured by an attachment device to the front of the box blade; and removing any undesired objects to a storage box on the frame member.

10. The method of claim 9 wherein the lifting member is a crank.

11. The method of claim 9 wherein the lifting member is a hydraulic cylinder.

12. The method of claim 9 wherein the attachment device is a ball type hitch.

13. The method of claim 9 wherein the land based vehicle is an all terrain vehicle.

14. The method of claim 9 wherein the land based vehicle is a tractor.

15. The method of claim 9 wherein the land based vehicle is an automobile.

16. A transporting mechanism comprising:

an attachment, having front, rear, top and bottom sides;

a land based vehicle secured to the front of the attachment;

a frame member having two opposite ends which is rotatably secured to the rear side of the attachment at one end and operatively secured to one or more wheels at the other end;

a storage box for undesired objects, the storage box being on the frame member; and a lifting member operatively secured to the frame member and to the top side of the attachment.

17. The transporting mechanism of claim 16 wherein the lifting member is a crank.

18. The transporting mechanism of claim 16 wherein the lifting member is a hydraulic cylinder.

19. The transporting mechanism of claim 16 wherein the land based vehicle is an all terrain vehicle.

20. The transporting mechanism of claim 16 wherein the attachment is a box blade.

21. A box blade assembly for attachment to a land based vehicle without the need for a three point hitch, and for use on a work surface comprising:

a box blade having at least two opposing side walls, an open top and bottom, front and rear sides, one or more frame members connecting the side walls and a cutting surface running between the side walls and extending below the bottom edge of said side walls;

a movable frame member, having a front and rear section, wherein said front section is rotatably secured to the rear side of the box blade;

one or more wheels operatively secured to the rear section of the movable frame member; and a crank including a handle, the handle being within the reach of an operator of the vehicle, the crank being operatively secured to the box blade and the rear section of the movable frame member.

* * * * *